(12) United States Patent
Tian et al.

(10) Patent No.: US 6,916,547 B2
(45) Date of Patent: Jul. 12, 2005

(54) MULTI-FUNCTIONAL UNSATURATED POLYESTER POLYOLS

(75) Inventors: Dong Tian, Lancaster, PA (US); Jeff S. Ross, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 123 days.

(21) Appl. No.: 10/062,380

(22) Filed: Feb. 1, 2002

(65) Prior Publication Data

US 2003/0148126 A1 Aug. 7, 2003

(51) Int. Cl.[7] .......................... B32B 27/36; C08G 63/12; C08G 63/20; C08G 63/40; C08G 63/78
(52) U.S. Cl. .................. 428/480; 428/195; 428/323; 428/141; 428/329; 528/298; 528/300; 528/302; 528/303; 528/306; 528/354; 528/361; 528/363
(58) Field of Search .................. 428/195, 480, 428/323, 141, 329; 528/298, 300, 302, 303, 306, 354, 361, 363

(56) References Cited

U.S. PATENT DOCUMENTS

| | | | | |
|---|---|---|---|---|
| 3,169,945 A | * | 2/1965 | Young et al. | 528/355 |
| 3,654,347 A | | 4/1972 | Kincaid et al. | 260/484 |
| 3,700,643 A | | 10/1972 | Smith et al. | 260/77.5 |
| RE29,131 E | | 2/1977 | Smith et al. | 260/77.5 |

(Continued)

FOREIGN PATENT DOCUMENTS

EP 0 151 495 8/1985 ........... C07C/69/54
EP 0 610 086 A2 4/1994 ........... C08G/63/08

OTHER PUBLICATIONS

Gopp, Udo, Sandner, Barbara, and Schoch, Martin *Synthesis and structures of cooligo (lactone) macromonomers* Macromol. Symp. 130 (1998), pp. 113–126.

Sandner, Barbara, Steurich, Simone, and Gopp, Udo (*Synthesis and characterization of oligo (lactone) methacrylates* Polymer, vol. 38, No. 10 (1997), pp. 2515–2522.

Gopp, Udo, Sandner, Barbara, and Hahne, Bodo *Thermal and Mechanical Properties of Poly (Methacrylate) Networks with Cooligo (Lactone)Branches* Macromol. Symp. 153 (2000), pp. 321–332.

Primary Examiner—Vivian Chen

(57) ABSTRACT

Novel multifunctional unsaturated polyester polyols, UV-curable top coat formulations including these polyols, and a one-step process for preparing these polyols, are disclosed. Surface coverings and surface covering components including these top coat formulations are also disclosed. The polyols are generally formed by the ring opening polymerization of a lactone with a compound of the formula $(R^1)_a R(OH)_b$, where $a+b>2$. $R^1$ is a double bond-containing moiety such as allyl, vinyl, vinylidene, vinyl ether, acrylate, and the like. R is generally an alkyl, aryl, aralkyl, alkaryl, ether or ester group, including substituted versions thereof. R can be a polymer, including polymers with a plurality of functional groups. Examples of lactone groups which can be used include caprolactone, lactide and glycolide. The polyols can be used in 100% solids, solvent and water based radiation cured coatings, thermal cured coatings, dual cure (thermal with UV/e-beam, or UV/e-beam with thermal curing) coatings, and other types of coatings. These new resins enhance coating performance due to their multi-functional groups in the polymer chain.

28 Claims, 1 Drawing Sheet

U.S. PATENT DOCUMENTS

| | | | | |
|---|---|---|---|---|
| 4,150,169 A | | 4/1979 | Bagley et al. | 427/54 |
| 4,153,778 A | * | 5/1979 | Park et al. | 528/76 |
| 4,165,345 A | * | 8/1979 | Smith et al. | 523/419 |
| 4,261,871 A | * | 4/1981 | Smith et al. | 523/400 |
| 4,555,449 A | | 11/1985 | Koleske et al. | 428/411.1 |
| 4,618,635 A | | 10/1986 | Osborn et al. | 524/113 |
| 4,632,975 A | * | 12/1986 | Cornell et al. | 528/354 |
| 4,683,287 A | | 7/1987 | Koleske et al. | 528/357 |
| 4,691,045 A | * | 9/1987 | Fukuchi et al. | 560/185 |
| 4,725,653 A | * | 2/1988 | Koleske | 525/510 |
| 4,751,112 A | * | 6/1988 | Smith et al. | 427/388.3 |
| 4,781,987 A | | 11/1988 | Bolgiano et al. | 428/424.6 |
| 4,791,189 A | | 12/1988 | Yu | 528/355 |
| 4,855,165 A | | 8/1989 | Bolgiano et al. | 427/393.5 |
| 4,916,254 A | | 4/1990 | Watanabe et al. | 560/185 |
| 5,128,385 A | | 7/1992 | Christie et al. | 522/33 |
| 5,140,088 A | | 8/1992 | Ehrhart et al. | 528/59 |
| 5,232,996 A | | 8/1993 | Shah et al. | 525/452 |
| 5,281,682 A | * | 1/1994 | Cornforth et al. | 526/273 |
| 5,328,940 A | | 7/1994 | Zimmer | 522/31 |
| 5,418,016 A | * | 5/1995 | Cornforth et al. | 427/515 |
| 5,494,707 A | | 2/1996 | Wang et al. | 427/412.1 |
| 5,543,232 A | | 8/1996 | Ehrhart et al. | 428/482 |
| 5,616,630 A | * | 4/1997 | Heinze | 522/96 |
| 5,643,677 A | | 7/1997 | Feifer et al. | 428/424.6 |
| 5,719,227 A | | 2/1998 | Rosenberry et al. | 524/590 |
| 5,731,406 A | | 3/1998 | Wasson | 528/357 |
| 5,843,576 A | | 12/1998 | Rosenberry et al. | 428/423.1 |
| 5,891,587 A | | 4/1999 | Hu et al. | 428/690 |
| 5,912,381 A | | 6/1999 | Narayan et al. | 560/81 |
| 5,990,260 A | | 11/1999 | Pettersson | 528/190 |
| 6,048,936 A | * | 4/2000 | Epple et al. | 525/124 |
| 6,146,711 A | | 11/2000 | Courtoy et al. | 427/493 |
| 6,291,078 B1 | | 9/2001 | Chen et al. | 428/543 |

* cited by examiner

MULTI-FUNCTIONAL UNSATURATED POLYESTER POLYOLS

FIELD OF THE INVENTION

This invention is generally in the area of multi-functional unsaturated polyester polyols for use in UV-curable top coat formulations.

BACKGROUND OF THE INVENTION

Commercially available UV-curable top coat formulations which include unsaturated polylactone-based polyols containing two functional groups are known in the art, and described, for example, in U.S. Pat. Nos. 3,700,643 and RE 29,131, the contents of which are hereby incorporated by reference. RE 29,131 teaches that (meth)acrylated-capped polycaprolactone can be formed by reacting a polycaprolactone polyol which contains at least one free hydroxyl group with an organic isocyanate and a hydroxyalkyl (meth) acrylate. Polycaprolactone polyols will also react with (meth)acrylic acid or hydroxyalkyl (meth)acrylate to produce a (meth)acrylated-capped polycaprolactone derivative. U.S. Pat. No. 4,791,189 discloses the cationic ring-opening polymerization of a lactone in the presence of an alcohol having a vinyl head group and using an oxonium salt or etherate of boron trifluoride as the cationic ring-opening catalyst, to produce a polylactone macromonomer. The macromonomer includes a vinyl functional head group at one end and a hydroxyl (OH) group at the other. U.S. Pat. No. 4,916,254 discloses using a stannous halide as a catalyst for reacting ε-caprolactone and a hydroxyalkyl (meth) acrylate to produce polycaprolactone-modified hydroxyalkyl (meth)acrylate. U.S. Pat. No. 5,731,406 discloses using phosphoric acid as a catalyst for preparing a macromonomer by reacting a lactone and a hydroxyalkyl (meth) acrylate. U.S. Pat. No. 4,683,287 discloses using stannous octanoate, dibutyltin dilaurate, tetraisopropyl titanate, butyl titanate, and mixtures thereof as a catalyst for preparing a macromonomer by reacting a lactone and a hydroxyalkyl (meth)acrylate.

U.S. Pat. Nos. 4,555,449 and 4,632,975 disclose polyfunctional acrylate derivatives of caprolctone-polyols prepared by reacting a caprolactone polyol with (meth)acrylic acid in the presence of a strong acid catalyst. U.S. Pat. No. 4,150,169 discloses that multi-functional unsaturated polycaprolactones can be made by reacting trimethylolpropane diallyl ether, 4,4'-diisocyanato-dicyclohexyl methane and polycaprolactone triol. U.S. Pat. No. 4,618,635 discloses a composition that includes the reaction product of a polycaprolactone polyol, a multifunctional isocyanate, a lactone-acrylate adduct and, optionally, a hydroxyalkyl acrylate. These approaches all involve two step reactions, where the first step involves forming the polycaprolactone polyols, and the second step involves modifying the end-capped hydroxyl groups to form the radiation curable groups.

It would be advantageous to have methods for forming multifunctional compounds in a one-step reaction, and also to have new multifunction compounds for use in UV-curable top coat formulations. The present invention provides such compounds and methods.

SUMMARY OF THE INVENTION

Novel multifunctional unsaturated polyester polyols, UV-curable top coat formulations including these polyols, and a one-step process for preparing these polyols, are disclosed. Surface coverings and surface covering components including these top coat formulations are also disclosed.

The polyols themselves are generally formed by the ring opening polymerization of a lactone with a compound of the formula $(R^1)_a R(OH)_b$, where a+b>2. $R^1$ is a double bond-containing moiety such as allyl, vinyl, vinylidene, vinyl ether, acrylate, and the like. R is generally an alkyl, aryl, aralkyl, alkaryl, ether or ester group, including substituted versions thereof. R can be a polymer, including polymers with a plurality of functional groups. Functional groups include those groups generally known in the field of organic chemistry as used in making and breaking chemical bonds (i.e., hydroxy, thiol, amine, carboxy, ester, and the like). Examples of lactone groups which can be used include caprolactone, lactide and glycolide.

The polyols can be used in radiation cure urethane type coatings, melamine based dual cure (thermal/UV, or UV/thermal curing) coatings, and other types of coatings. These new resins enhance coating performance due to their multi-functional groups in the polymer chain.

DETAILED DESCRIPTION OF THE INVENTION

Figure 1:
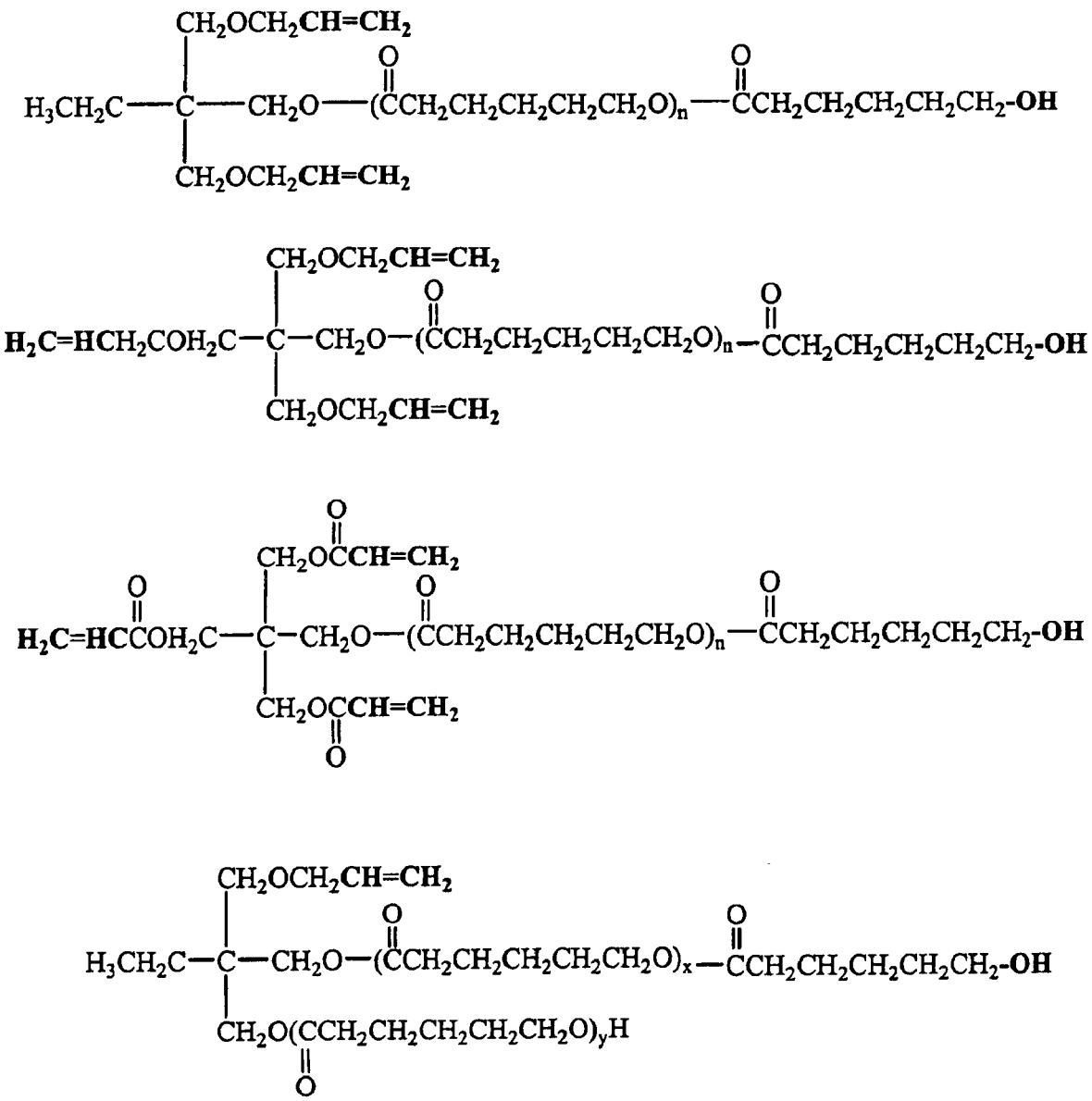
FIG. 1 is an illustration of various structural embodiments of the multifunctional unsaturated polyester polyols described herein.

Novel multifunctional unsaturated polyester polyols, UV-curable top coat formulations including these polyols, and a one-step process for preparing these polyols, are disclosed. Top coat formulations including the polyols, and surface coverings and surface covering components including the top coat formulations, are also disclosed.

The unsaturated polyester polyols have wide application in the radiation cure coating market. Only di-functional unsaturated polyester polyols, such as Tone M100 (Dow), SR495 (Sartomer) and Fairad 7M100 (Fairad), are currently commercially available. However, multifunctional polyester polyols are highly desired to tailor coating performance. The process for preparing novel multi-functional unsaturated polyester polyols is very efficient.

These new multifunctional unsaturated polyester polyols can be used in radiation cure urethane type coatings, or melamine based dual cure (thermal/UV, or UV/thermal curing) coatings. These new resins enhance coating performance due to their multi-functional groups in the polymer chain.

The top coat formulations described herein provide top coat layers with good thermal curability, and forms coating films with good scratch resistance, outward appearance and stain resistance.

The unsaturated polyester polyols include any polyol encompassed by the reaction of a lactone moiety with a hydroxy, olefin containing compound as defined herein. Generally, the compounds have the following formula:

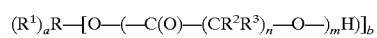

and are prepared by reacting a lactone with a compound of the formula $(R^1)_a R(OH)_b$, wherein:

a and b are, independently, equal to or greater than 1, and a+b combined are greater than 2, n is a number between 1 and 20, typically between 3 and 14, m is a number between 1 and about 50, typically between 1–10.

R is an alkyl, aryl, aralkyl, alkaryl, ether or ester group, or substituted versions thereof, $R^1$ is an olefin-containing moiety, examples of which include allyl, vinyl ether, vinyl, vinylidene, and (meth)acrylate, $R^2$ and $R^3$ are, independently, H, alkyl, aryl, aralkyl, alkaryl, ether, alkoxy, acetal, or ester group, or substituted versions thereof or $R^2$ and $R^3$ combine to form a cycloalkane wherein one or more of the carbons can be replaced with a heteroatom, for example, oxygen, nitrogen and/or sulfur, wherein one or more of the $C(R^2R^3)$ groups can be replaced with a heteroatom, which in one embodiment is oxygen. In the lactone starting material, when the heteroatom is oxygen, and one of the $R^2$ or $R^3$ groups on the adjacent carbon is an alkoxy group, the resulting compound is a cyclic acetal.

Definitions:

The terms "vinylic" or "olefin-containing" as referred to herein are meant to indicate the group derived from a compound having polymerizable carbon-carbon double bonds, such as vinyl, vinylidene, vinyl ether, allyl, (meth)acrylate and the like.

The term "alkyl" or "alkylene" refers to a straight, branched or cyclic hydrocarbon chain including between 1 to about 20 carbon atoms, where alkyl is a monoradical and alkylene is a diradical.

The terms "substituted alkyl" and "substituted alkylene" refers to alkyl and alkylene groups as defined above, including between 1 and about 5 substituents. The substituents are advantageously substituents which do not adversely effect the ring opening polymerization chemistry and/or the free radical polymerization (typically effected by ultraviolet (UV) or electron beam (EB) irradiation) of the resulting macromonomer. Examples of suitable substituents include ether, for example, aryloxy and alkoxy, alkyl, aryl, aralkyl, alkaryl, alkenyl, acyl, acyloxy, cyano, halogen, keto, carboxyl, carboxylalkyl, thioaryloxy, thioether, including thioalkoxy and thioaryloxy, nitro and substituted versions thereof.

The term "alkaryl" refers to the groups -alkylene-aryl and substituted versions thereof, where alkylene and aryl are defined herein and where the substituents are as described above for alkyl. Examples include benzyl, phenethyl and the like.

The term aralkyl refers to the groups -aryl-alkyl and substituted versions thereof.

The term "alkoxy" refers to the groups alkyl-O— and alkenyl-O—, and substituted versions thereof, where alkyl and alkenyl are as defined herein. Examples of alkoxy groups include methoxy, ethoxy, n-propoxy, iso-propoxy and the like.

The term "ether" refers to the groups -alkylene-O-alkyl, -alkylene-O-aryl, -alkylene-O-aralkyl, -alkylene-O-alkaryl, -aryl-O-alkyl, -aryl-O-aryl, -aryl-O-alkaryl, -aryl-O-aralkyl, -aralkyl-O-alkyl, -aralkyl-O-aryl, -aralkyl-O-alkaryl, -aralkyl-O-aralkyl, -alkaryl-O-alkyl, -alkaryl-O-aryl, -alkaryl-O-alkaryl, -alkaryl-O-aralkyl, and substituted versions thereof, where the substituents are as described above for alkyl. The term thioether refers to ether groups wherein the oxygen is replaced with a sulfur.

The terms "alkenyl" and "alkenylene" refer to a monoradical and diradical, respectively, of a straight, branched or cyclic unsaturated hydrocarbon group including between 2 to about 20 carbon atoms and including at least 1 site of vinyl unsaturation. Examples include ethenyl ($—CH=CH_2$), n-propenyl($—CH_2CH=CH_2$), iso-propenyl ($—C(CH_3)=CH_2$), and the like. These groups can include substituents as described above for alkyl.

The term "acyl" refers to the groups HC(O)—, alkyl-C(O)—, aralkyl-C(O)—, alkaryl-C(O)—, aryl-C(O)—, alkenyl-C(O)—, and substituted versions thereof, where the substituents are as defined herein for substituted alkyl.

The term "acyloxy" refers to the groups alkyl-C(O)O—, alkaryl-C(O)O—, aralkyl-C(O)O—, aryl-C(O)O—, and substituted versions thereof, wherein substituents are as defined herein for substituted alkyl.

The term "aryl" refers to an unsaturated aromatic carbocyclic group of from 6 to 20 carbon atoms having a single ring (e.g., phenyl) or multiple condensed (fused) rings (e.g., naphthyl or anthryl). Examples include phenyl, naphthyl and the like. The aryl groups can be substituted with between one and five substituents as described above with respect to alkyl.

The term "aryloxy" refers to the group aryl-O— wherein the aryl group is as defined above including optionally substituted aryl groups as also defined above.

The term "arylene" refers to the diradical derived from aryl (including substituted aryl) as defined above and is exemplified by 1,2-phenylene, 1,3-phenylene, 1,4-phenylene, 1,2-naphthylene and the like.

The term "amino" refers to substituted amino groups with the formula $—NR^3R^4$, where each $R^3$ and $R^4$ is, independently, alkyl, alkaryl, aralkyl, alkenyl, aryl and substituted versions thereof, provided that both $R^3$ and $R^4$ are not hydrogen, wherein substituents are as described above for alkyl.

The term "carboxyalkyl" or "alkoxycarbonyl" refers to the groups "—C(O)O-alkyl," "—C(O)O-substituted alkyl," "—C(O)O-alkenyl," and —C(O)O-substituted alkenyl," where alkyl, substituted alkyl, alkenyl and substituted alkenyl are as defined herein.

The term "halo" or "halogen" refers to fluoro, chloro, bromo and iodo.

As to any of the above groups which contain one or more substituents, it is understood, of course, that such groups do not contain any substitution or substitution patterns which are sterically impractical and/or synthetically non-feasible, and, in particular, those which adversely effect the ring opening polymerization reaction and/or the free radical polymerization of the resulting macromonomer.

The term "optional" or "optionally" means that the subsequently described event, circumstance or substituent may or may not occur, and that the description includes instances where said event or circumstance occurs and instances where it does not.

I. Multifunctional Unsaturated Polyester Polyols

As discussed above, the polyols typically have the formula

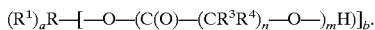

$(R^1)_aR—[—O—(C(O)—(CR^3R^4)_n—O—)_mH]_b$.

Specific examples of the polyester polyols are shown in FIG. 1. The polyester polyols can be formed by reacting a lactone, for example, caprolactone, lactide, glycolide and the like, with an olefin and hydroxy-containing macromonomer precursor in the presence of an acid catalyst. Of course, other methodology known in the art can also be used. The individual reaction components are described in more detail below.

A. Olefin and Hydroxy-containing Macromonomer Precursor

The precursor to the multifunctional unsaturated polyester polyols is an olefin and hydroxy-containing molecule with the general formula: $(R^1)_aR(OH)_b$, where a and b are each equal or greater than one, and a+b>2. $R^1$ is generally an alkyl, alkaryl, aralkyl, aryl, ether, thioether or ester group which includes one or more vinylic groups, and which is optionally substituted as described above. R is generally an alkyl, alkaryl, aralkyl, aryl, ether, thioether or ester group, which is optionally substituted as described above.

Examples of the $(R^1)_aR(OH)_b$ type starting material include trimethylolpropane diallyl ether, pentaerythritol triallyl ether, trimethylolpropane diacrylate, pentaerythritol triacrylate, trimethylolpropane monoallyl ether, 1,4-pentadien-3-ol, pentaerythritol diacrylate monostearate, and di-pentaerythritol hydroxy pentaacrylate.

B. Lactones

Any lactone which can react in a ring-opening polymerization with the hydroxy and olefin-containing compound can be used. As used herein, lactones are cyclic esters of hydroxy acids, including, for example, various commercially available delta, epsilon and gamma lactones (i.e., including 5, 6 and 7 membered rings), with one or more carbonyl groups and one or more ring oxygens. Specific examples include caprolactone, valerolactone, glycolide and lactide, as well as substituted versions thereof. The lactone of the 12-hydroxylauric acid is another commercially available lactone.

The ring carbons on the lactones, as well as various alkyl or other groups present as substituents on the lactone ring, can be substituted with virtually any substituent which does not adversely effect the ring opening polymerization chemistry. As the ring opening polymerization chemistry involves reaction with a Lewis or protic acid, it is generally preferred that the substituents are not acid sensitive. Examples of non-acid sensitive substituents include halo, ether, thioether, alkyl, aryl, aralkyl, alkaryl, substituted alkyl, substituted aryl, substituted aralkyl, substituted alkaryl, ether, including oxyalkyl, substituted ether, thioether, substituted thioether.

In some embodiments, the alkyl groups are present adjacent the ring carbonyl and/or ring oxygen atom. The presence of certain groups at certain positions may hinder or promote the ring opening polymerization, and can be used to control the degree of polymerization (and, accordingly, the number average molecular weight of the resulting macromonomer), as well as various other properties, including the degree of crystallinity and the resulting effect on various other physical and mechanical properties.

The lactones typically fall within one or more of the following formulas:

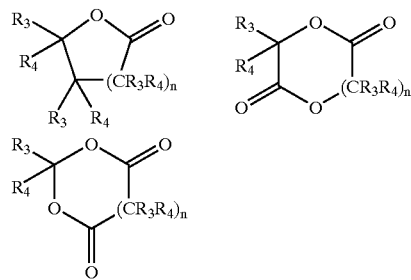

where $R^2$ and $R^3$ are, independently, H, alkyl, aryl, aralkyl, alkaryl, ether, alkoxy, acetal, or ester groups, or substituted versions thereof, or $R^2$ and $R^3$ combine to form a cycloalkane wherein one or more of the carbons can be replaced with a heteroatom, for example, oxygen, nitrogen and/or sulfur.

One or more of the $C(R^2R^3)$ groups in the lactone can be replaced with a heteroatom, which in one embodiment is oxygen. When the heteroatom is oxygen, and one of the $R^2$ or $R^3$ groups on the adjacent carbon is an alkoxy group, the resulting compound is a cyclic acetal.

C. Acid Catalyst

Any acid catalyst which is known to react an alcohol group with a lactone group can be used. Examples of suitable catalysts include Lewis acids such as stannous titanate, stannous octanoate, dibutyltin dilaurate, tetraisopropyl titanate, butyl titanate, and the like, protic acids such as phosphoric acid, sulfuric acid, Dowex 50, and the like, and mixtures thereof.

II. Methods of Preparing the Multifunctional Unsaturated Polyester Polyols

The novel multi-functional unsaturated polyester polyols can be prepared in a one pot reaction between a lactone and a $(R^1)_aR(OH)_b$ type alcohol, typically between 80° C. to about 180° C. The reaction is acid-catalyzed, by a Lewis acid, a protic acid or combinations thereof.

III. Top Coat Formulations Including the Polyol Macromonomer

The polyol macromonomers can be incorporated into water based, solvent based and 100% solids coating formulations. The 100% solids coating formulations can be cured by UV or e-beam radiation, but these monomers can also be incorporated into thermal cure formulations. Examples of thermal cured coating formulations can include reactions with isocyanates, melamine, free radicals, etc. Thermal cure formulations can also be made that subsequently can be further cured or treated by UV or e-beam radiation to enhance properties. Additionally, some formulations can made that can be first UV or e-beam cured followed by completing the cure thermally. Some examples of top coat formulation types can be found in the following patents: U.S. Pat. Nos. 5,719,227; 4,683,287; 5,643,677; 5,140,088; 5,543,232; 5,891,587; 6,146,711; 5,843,576; 5,328,940; 5,232,996; and 5,128,385.

The macromonomer can be present in substantially pure form, can be diluted in one or more solvents, and can be present in an emulsion and/or dispersion. In some embodiments, the macromonomer is present as an aqueous solution, suspension or dispersion in an aqueous solvent which can optionally include up to about 30 percent by weight of a water miscible co-solvent, for example, acetone, methanol, cyclic ethers such as tetrahydrofuran, dimethylsulfoxide, dimethyl formamide and mixtures thereof.

In some embodiments, the macromonomer is present in an organic solvent that is unreactive under the polymerization conditions. Examples of suitable solvents include hydrocarbons (toluene, xylene, n-hexane, cyclohexane, etc.), acetates (ethyl acetate, butyl acetate, etc.), ethers, and ketones (methyl ethyl ketone, ethyl acetoacetate, acetylacetone, methyl isobutyl ketone, and acetone). Cyclic ethers include tetrahydrofuran and tetrahydropyran.

In still other embodiments, a 100 percent solids formulation is used. Such formulations can be particularly advantageous since they do not result in significant hydrocarbon emissions. A reactive diluent system, or monomer diluent system, is employed in combination with the free radical polymerizable macromonomer to define the properties, both before and after cure, of the compositions described herein. Suitable reactive diluent systems include at least one ethylenically unsaturated addition-polymerizable monomer which is copolymerizable with the macromonomer upon exposure to a source of free radicals and/or radiation such as UV or EB radiation.

The monomer diluent can include acrylate or methacrylate unsaturation, as well as other types of monomer diluents which include non-(meth)acrylate vinyl unsaturation. The reactive diluent system can include mono-, di-, tri-, and higher functional diluents. Functionality can be selected to achieve sufficiently high elongation or to optimize other properties in the top coat layer. The molecular weight of the diluent is typically low enough to allow it to be a liquid at room temperature, and in general, is less than about 1,000 g/mol. Mixtures of diluents can be used.

Examples of the monofunctional reactive diluents include isobornyl acrylate (IBOA), phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxy-ethoxy)ethyl acrylate, n-lauryl acrylate, 2-phenoxyethyl acrylate, glycidyl methacrylate, glycidyl acrylate, acrylated methylolmelamine, and 2-(N,N-diethylamino)-ethyl acrylate.

Examples of polyfunctional reactive diluents include neopentyl glycol diacrylate, alkoxylated neopentyl glycol diacrylate, ethylene glycol diacrylate, hexylene glycol diacrylate, diethylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylolpropane triacrylate which contains from 2 to about 20 moles of either ethylene or propylene oxide, triethylene glycol diacrylate, tetraethylene glycol diacrylate, polyethylene glycol diacrylate, any corresponding methacrylates thereof, and combinations thereof.

Examples of non-(meth)acrylate reactive diluents include vinyl, N-vinyl, vinyl-ether, vinylester and allyl groups. Suitable examples of this type of reactive diluent include N-vinylformamide (NVF), adducts of NVF with diisocyanates such as toluene diisocyanate and isophorone diisocyanate, derivatives of N-vinylformamide, N-vinylcaprolactam, N-vinylpyrrolidone, butyl-vinylether, 1,4-butyl-divinylether, dipropyleneglycol-divinylether, the vinylester of acetic acid, lauryl acid, dodecanoic acid or cyclohexylcarboxylic acid, adipic acid, glutaric acid or the like, triallylisocyanurate, diallylphthalate, butyl-allyl-ether and the like. In one embodiment, the diluents are monofunctional.

The reactive diluent can be present from about 10 wt. % to about 90 wt. %, depending on the desired properties of the top coat layer and the molecular weight and solubility of the macromonomer. Those of skill in the art can readily optimize the concentration of the macromonomer in the reactive diluent.

Photoinitiator

The polymerizable material (macromonomer and, optionally, reactive diluent) can optionally include one or more photoinitiators to catalyze or accelerate cure by exposure to ultraviolet radiation. If the polymerizable material is cured by exposure to electron beam radiation, a photoinitiator is not typically used.

The photoinitiator can be any of the known photoinitiators such as benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxy-acetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthraquinone, triphenylamine, 3- and 4-allylacetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert.butylbenzophenone, isobutyl ether-benzoic acetate, benzil benzilic acid, amino benzoate, methyl blue, 2,2-diethoxyacetophenone, 9,10-phenanthrenequinone, 2-methyl anthraquinone, 2-ethyl anthraquin.one, 1-tert.butylanthraquinone, 1,4-naphthaquinone, isopropylthioxanthone, 2-isopropylthioxa.nthone, 2-methylthioxanthone, 2-decylthioxanthone, 2-dodecylthioxanthone, 2-methyl-1, [4-(methyl thio)phenyl]-2-morpholinopropanone-1, combinations thereof and the like.

The optional photoinitiator or combination of photoinitiators is typically used in an amount ranging from about 1 to 10 wt. % by weight of the polymerizable materials.

Melamines and Other Amino Resins

In some embodiments, the formulation includes a melamine so that the top coat formulation cures by two or more mechanisms, and also to improve the curability of the composition and improve the outward appearance of the top coat layer.

The amount of the amino resin for forming the melamine portion of the layer is typically less than about 40 parts by weight of the total resin content (including the macromonomer and any reactive diluents).

Examples of suitable amino resins include methylolated amino resins such as melamine resins, urea resins, guanamine resins, etc., which can be prepared by reacting an amino component, such as melamine, urea, benzoguanamine, glycol urea, acetoguanamine, dicyandiamide and the like, with an aldehyde component such as formaldehyde, paraformaldehyde, acetaldehyde, benzaldehyde and the like. Melamine resins are advantageously used. The amino resins (e.g., methylolated amino resins) may be etherified with alcohols such as methyl alcohol, ethyl alcohol, n-propyl alcohol, iso-propyl alcohol, n-butyl alcohol, iso-butyl alcohol, 2-ethylbutanol, 2-ethylhexanol, etc.

Specific examples of amino resins include n-butylated melamine resins such as Mitsui Toatsu Chemical's Uban 20SE, Uban 20SE-60, Uban 128, Uban 220, Uban 225, Uban 20SB, Uban SE-60, Uban 21R, Uban 22R, Uban 122, Uban 28–60, Uban 20HS, Uban 2028, Uban 202, Uban 120, as well as Solutia's Resimene 751, Resimene 755, Resimene 757, Resimene 750, Resimene CE 6517, Resimene CE 6550, Resimene CE 4514, Resimene CE 7103, etc.; isobutylated melamine resins such as Uban 62, Uban 69-1, Uban 169, Uban 2061, etc.; butylated urea resins such as Uban 10S-60, Uban 10R, etc.; melamine resins such as Cytec's Cymel 303, Cymel 232, Cymel 370, Cymel 325, Cymel 236, Cymel 738, Cymel 771, Cymel 327, Cymel 703, Cymel 701, Cymel 266, Cymel 267, Cymel 285, Cymel 235, Cymel 238, Cymel 1141, Cymel 272, Cymel 254, Cymel 202, Cymel 1156, Cymel 1158, Cymel 300, Cymel 301, Cymel 350, Cymel 736, and Solutia's Resimene AQ-7550, Resimene 717, Resimene 718, Resimene 745, Resimene 747, Resimene 741, Resimene 730, Resimene 733, Resimene 2608, etc. Of those, preferred are alkyl-etherified melamine resins such as Cymel 235, Cymel 238, Cymel 1158, Resimene 745, Resimene 747, Resimene 757, Resimene 740, Resimene CE 7103, Resimene CE 6550, Urban 225, Urban 202, Urban 2061, etc.

Optional Components

Conventional additives such as flatting agents, hard particles (such as aluminum oxide), adhesion promoters, for example silane-containing adhesion promoters, lubricants and/or the like can be employed in the compositions and/or production processes of the present invention to the extent they do not adversely affect the effect achieved by the present invention.

If desired, the top coat formulation can be colored by colorants, dyes, pigments, and mixtures thereof Conventional colorants can be used as long as they are color stable and do not interfer with the curing process.

IV. Methods of Applying the Top Coat Formulations

The top coat formulation can be applied to a substrate to be coated by conventional methods such as by spraying, dipping, or passing the substrate through a Kiss roll applicator as is known in the art. Other methods for coating substrates with top coat compositions known in the art can also be used.

V. Methods of Curing the Top Coat Formulations

In one embodiment, the top coat formulation is polymerized by exposing the top coated substrate to any source of actinic radiation at a wavelength within the ultraviolet or visible spectral regions so long as that wavelength overlaps the absorption spectrum of any photoinitiator being used. Suitable sources of radiation include mercury, xenon, carbon arc and tungsten filament lamps, sunlight, etc. Exposures may be from less than about 1 second to 1 minute or more depending upon the amounts of particular polymerizable materials and photoinitiators being used, and depending upon the radiation source and distance from the source. The suitable exposure will vary depending on the particular production process. However, in general, the exposure to UV light generally is between about 0.1 and about 2.0 $J/cm^2$, and more in particular between about 0.5 and about 1.5 $J/cm^2$.

If the polymerizable material is polymerized by exposure to electron beam irradiation, a dosage is used typically ranging from less than about 1 megarad to about 100 megarads or more, typically ranging from about 2 to about 10 megarads.

Generally speaking, the rate of polymerization increases with increasing amount of photoinitiator at a given light exposure and also increases with increasing light intensity. The use of thermal energy during or after exposure to a radiation source will also generally accelerate the curing reaction, and even a moderate increase in temperature may greatly accelerate cure rate. In another embodiment, the top coat formulation can be first thermally cured followed by further curing with UV or e-beam radiation. In one case, these top coat formulations can be water based and and involve a melamine type thermal curing mechanism.

In another embodiment, the top coat formulation can be formulated for total thermal cure and not involve a B-stage cure.

In another embodiment, the top coat composition after curing has physical properties that are acceptable for flooring applications. These include, color stability, impact resistance, scratch resistance, stain resistance, etc. Examples of desirable physical properties can be found in (the following U.S. Pat. Nos. 5,543,232; 5,719,227; 5,643,677; 6,291,078; 5,494,707.

VI. Surface Coverings and Surface Covering Components Including the Top Coat Formulations Virtually any surface covering substrate can be coated with the top coat formulations described herein. Examples of surface covering substrates that can be prepared using the compositions and methods described herein include those described, for example, in U.S. Pat. No. 4,781,987, U.S. Pat. No. 4,855,165 and U.S. Pat. No. 5,643,677, the contents of which are hereby incorporated by reference. Examples of surface covering substrates can include wood, laminate, and resilient sheet and tile goods.

Surface coverings that include these substrates and the wear layer described herein can be, for example, floor coverings, wall and ceiling coverings, countertops, laminates, and other surfaces that can be covered with decorative surface coverings. Examples include wallpaper, vinyl floors and the like.

The substrate may include resilient flooring structures. Such substrates are well known in the art, and can include layers such as felt backing materials, encapsulated glass mats, plastisol films, foam layers, hot-melt calendared layers (for example, of a polyvinyl chloride, polyolefin or other thermoplastic polymer), randomly dispersed vinyl particles, stencil disposed vinyl particles, wear layers and the like. The selection of these materials is within the skill of an ordinary artisan. The thickness of such substrates is typically, but not necessarily, in the range of 40 to 125 mils.

In some embodiments, a print layer is printed on top of a wear layer and beneath the top coat layer, where the print layer includes various UV photoinitiators and/or curing altering agents. However, it is important that the print layer adequately adhere to the wear and top coat layers. In this embodiment, it may not be necessary to incorporate a photoinitiator into the top coat layer.

The present invention will be better understood with reference to the following non-limiting example.

EXAMPLE 1

Preparation of a Multifunctional Unsaturated Polyester Polyol

A 1500 ml flask was equipped with a stirrer, condenser, thermometer and nitrogen inlet and outlet tubes and used as the reactor. 480 grams of ε-caprolactone were charged into the flask and stirred 10 minutes with sparging nitrogen, then heated to 110° C. A mixture of 0.70 grams monomethyl ether hydroquinone (p-methoxyphenol) and 476.85 grams trimethylolpropane diallyl ether was added to the flask, followed by 1.03 grams stannous octanoate. After 10 minutes, the sparging nitrogen was changed to blank nitrogen. The reaction mixture was held for 3 hours at 110° C., then cooled to room temperature and the product was collected. The final product had a Brookfield viscosity of 85 centipoise at 25° C., APHA color of 25, hydroxyl number of 112 and acid number of 0.20.

Examples 2–5 below relate to additional examples of multifunctional unsaturated polyester polyols.

EXAMPLE 2

A mixture of 0.68 grams monomethyl ether hydroquinone (p-methoxyphenol) and 307.97 grams trimethylolpropane diallyl ether was added to the flask, followed by 1.00 grams stannous octanoate. After 10 minutes, the sparging nitrogen was changed to blank nitrogen. The reaction mixture was held for 8 hours at 110° C., then cooled to room temperature and the product was collected. The final product had a Brookfield viscosity of 175 centipoise at 25° C., APHP color of 25, hydroxyl number of 77 and acid number of 1.00.

EXAMPLE 3

A 1500 ml flask was equipped with a stirrer, condenser, thermometer and nitrogen inlet and outlet tubes and used as the reactor. 550.00 grams of ε-caprolactone were charged into the flask and stirred 10 minutes with sparging nitrogen, then heated to 110° C. A mixture of 0.70 grams monomethyl ether hydroquinone (p-methoxyphenol) and 399.81 grams trimethylolpropane monoallyl ether was added to the flask, followed by 1.02 grams stannous octanoate. After 10 minutes, the sparging nitrogen was changed to blank nitrogen. The reaction mixture was held for 3.5 hours at 110° C., then cooled to room temperature and the product was collected. The final product had a Brookfield viscosity of 150 centipoise at 25° C., APHP color of 25, hydroxyl number of 234 and acid number of 1.68.

Note:

In Example 1, the molar ratio of ε-caprolactone and trimethylolpropane diallyl ether is 2:1. In Example 2, the molar ratio of ε-caprolactone and trimethylolpropane diallyl ether is 4:1. In Example 3, the molar ratio of ε-caprolactone and trimethylolpropane monoallyl ether is 2:1. In Examples 1 and 2, each macromonomer chain contains one hydroxyl end-group and two allyl ether end-groups. In Example 3, each macromonomer chain contains two hydroxyl end-groups and one allyl ether end-group.

EXAMPLE 4

A 250 ml flask was equipped with a stirrer, condenser, thermometer and nitrogen inlet and outlet tubes and used as the reactor. 50.00 grams of ε-caprolactone were charged into the flask and stirred 10 minutes with sparging nitrogen, then heated to 125–130° C. A mixture of 0.115 grams monomethyl ether hydroquinone (p-methoxyphenol) and 106.54 grams pentaerythritol diacrylate monostearate was added to the flask, followed by 0.017 grams stannous octanoate. After 10 minutes, the sparging nitrogen was changed to blank nitrogen. The reaction mixture was held for 14 hours 15 minutes at 125–130° C., then cooled to room temperature and the product was collected. The final product is solid at room temperature and had hydroxyl number of 72 and acid number of 3.55.

EXAMPLE 5

A 250 ml flask was equipped with a stirrer, condenser, thermometer and nitrogen inlet and outlet tubes and used as the reactor. 25.00 grams of ε-caprolactone were charged into the flask and stirred 10 minutes with sparging nitrogen, then heated to 125–130° C. A mixture of 0.116 grams monomethyl ether hydroquinone (p-methoxyphenol) and 136.63 grams dipentaerythritol hydroxyl pentaacrylate was added to the flask, followed by 0.018 grams stannous octanoate. After 10 minutes, the sparging nitrogen was changed to blank nitrogen. The reaction mixture was held for 9 hours 20 minutes at 125–130° C., then cooled to room temperature and the product was collected. The final product had a Brookfield viscosity of 10700 centipoise at 25° C., APHP color of 60, hydroxyl number of 52 and acid number of 5.64.

What is claimed is:

1. A top coat formulation comprising a multifunctional unsaturated polyester polyol of the formula:

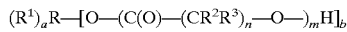

wherein:

a and b are, independently, equal to or greater than 1, and a+b combined are greater than 2, n is a number between 1 and 20, inclusive, m is a number between 1 and 50, inclusive, R is an alkyl, aryl, aralkyl or alkaryl, or substituted versions thereof, $R^1$ is an olefin-containing moiety, and $R^2$ and $R^3$ are, independently, H, alkyl, aryl, aralkyl, alkaryl, ether, alkoxy, acetal, ester, or substituted versions thereof, or $R^2$ and $R^3$ combine to form a cycloalkane wherein one or more of the carbons is optionally replaced with a heteroatom, wherein one or more of the $C(R^2R^3)$ groups can be replaced with a heteroatom.

2. The top coat formulation of claim 1, wherein at least one $R^1$ comprises an allyl, vinyl ether, vinyl, vinylidine or (meth)acrylate group.

3. The top coat formulation of claim 1, wherein R is selected from the group consisting of alkyl and alkaryl.

4. The top coat formulation of claim 1, wherein $R^2$ and $R^3$ are, independently, selected from the group consisting of H and $C_{1-6}$ alkyl.

5. The top coat formulation of claim 1, wherein a is between 2 and 6, inclusive.

6. The top coat formulation of claim 1, wherein b is between 2 and 6, inclusive.

7. The top coat formulation of claim 1, further comprising one or more additional components, selected from the group consisting of flatting agents, photoinitiators, reactive diluents, hard particles and adhesion promoters.

8. The top coat formulation of claim 7, wherein hard particles are aluminum oxide particles.

9. The top coat formulation of claim 1, wherein the formulation is radiation-curable.

10. The top coat formulation of claim 1, wherein the formulation is thermally curable.

11. The top coat formulation of claim 10, further comprising a cross-linking compound selected from the group consisting of melamine and isocyanate.

12. A surface covering comprising a top coat layer, the top coat layer comprising the reaction product of the top coat formulation of claim 11.

13. The surface covering of claim 12, wherein the top coat layer further comprises one or more additional components, selected from the group consisting of flatting agents, photoinitiators, reactive diluents, hard particles and adhesion, promoters.

14. The top coat formulation of claim 1, wherein the formulation is radiation-curable and thermally curable.

15. A surface covering comprising a top coat layer, the top coat layer comprising the cured top coat formulation of claim 1.

16. The surface covering of claim 15, wherein the surface covering is a floor covering.

17. The surface covering of claim 16, further comprising a wear layer.

18. The surface covering of claim 16, further comprising a design layer.

19. The surface covering of claim 16, further comprising a foam layer.

20. The surface covering of claim 16, further comprising a base layer.

21. The surface covering of claim 15, wherein the top coat layer further comprises one or more additional components, selected from the group consisting of flatting agents, photoinitiators, reactive diluents, hard particles and adhesion promoters.

22. The top coat formulation of claim 1, wherein n is a number between 3 and 14, inclusive.

23. A method of forming the top coat formulation comprising a multifunctional unsaturated polyester polyol of the formula:

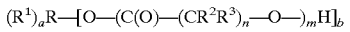

wherein:

a and b are, independently, equal to or greater than 1, and a+b combined are greater than 2, n is a number between 1 and 20, inclusive, m is a number between 1 and 50, inclusive, R is an alkyl, aryl, aralkyl, alkaryl, ether or ester group, or substituted versions thereof, $R^1$ is an olefin-containing moiety, and $R^2$ and $R^3$ are, independently, H, alkyl, aryl, aralkyl, alkaryl, ether, alkoxy, acetal, ester, or substituted versions thereof, or $R^2$ and $R^3$ combine to form a cycloalkane wherein one or more of the carbons is optionally replaced with a heteroatom, wherein one or more of the $C(R^2R^3)$ groups can be replaced with a heteroatom, the method comprising reacting a compound of the formula $(R^1)_aR(OH)_b$, where a+b>2, and a and b are, independently, equal to or greater than one, with a lactone in the presence of a suitable acid catalyst, wherein R is an alkyl, aryl, aralkyl, alkaryl, ether or ester group, or substituted versions thereof, and $R^1$ is an olefin-containing moiety.

24. The method of claim 23, further comprising adding a cross-linking compound selected from the group consisting of melamine and isocyanate.

25. The method of claim 24, wherein the cross-linking compound is added after the reaction of the compound of the formula $(R^1)_aR(OH)_b$ with the lactone.

26. The method of claim 23, further comprising adding one or more additional components, selected from the group consisting of flatting agents, photoinitiators, reactive diluents, hard particles and adhesion promoters to the top coat formulation.

27. The method of claim 26, further comprising adding a cross-linking compound selected from the group consisting of melamine and isocyanate.

28. The method of claim 27, wherein the cross-linking compound is added after the reaction of the compound of the formula $(R^1)_aR(OH)_b$ with the lactone.

* * * * *